United States Patent [19]
Lightner

[11] 3,904,372
[45] Sept. 9, 1975

[54] AUTOMATIC THIN LAYER CHROMATOGRAPHIC APPARATUS

[76] Inventor: Gene E. Lightner, R.D. No. 1, Kennett Square, Pa. 19348

[22] Filed: Jan. 11, 1973

[21] Appl. No.: 322,869

[52] U.S. Cl............... 23/253 R; 73/61.1 C; 141/98; 210/198 C
[51] Int. Cl.[2]................... G01A 31/08; B01D 15/08
[58] Field of Search..... 23/253 R, 232 C; 210/31 C, 210/198 C; 73/61.1 C

[56] References Cited
UNITED STATES PATENTS

| | | | |
|---|---|---|---|
| 3,038,340 | 6/1962 | Isreeli | 23/253 R UX |
| 3,449,959 | 6/1969 | Grimshaw | 23/253 R UX |
| 3,474,031 | 10/1969 | Blondeel | 210/31 C |
| 3,526,480 | 9/1970 | Findl | 23/253 TP |
| 3,574,064 | 4/1971 | Binnings et al. | 23/253 R X |
| 3,607,079 | 9/1971 | Maxon et al. | 23/253 TP |
| 3,667,917 | 6/1972 | Brandt | 73/61.1 C X |
| 3,758,275 | 9/1973 | Quame | 23/253 TP |

OTHER PUBLICATIONS
"Thin–Layer Chromatography," Egon Stahl, Academic Press Inc., N.Y., 1965, pps. 11–15 and 28;

*Primary Examiner*—Joseph Scovronek
*Assistant Examiner*—Arnold Turk

[57] ABSTRACT

The automatic apparatus described utilizes two pivotable arms, one a spotter arm, the second a pick-up arm. The pick-up arm operates to pick-up chromatographic plates from a supply magazine and place them in a position for spotting. After being spotted, with an aliquot of a sample fluid to be analyzed, the plates are transferred by the pick-up arm into discrete vertically disposed tanks positioned about a turntable. Solvent is applied to each tank immediately prior to insertion of the spotted plate therein. Upon development of a plate, usually one complete rotation of the tank turntable and after the solvent is drained from the tank, the pick-up arm picks up the developed plate and passes it down a chute to an automatic reader. The spotter arm has a capillary tube mounted on its end portion. This single tube is dipped into each sample vial which is disposed about a sample turntable in a ring-like fashion and transfers a sample aliquot to a precise position on the lower edge of a chromatographic plate. A reference sample aliquot is placed directly over the spot to provide an internal standard.

28 Claims, 10 Drawing Figures

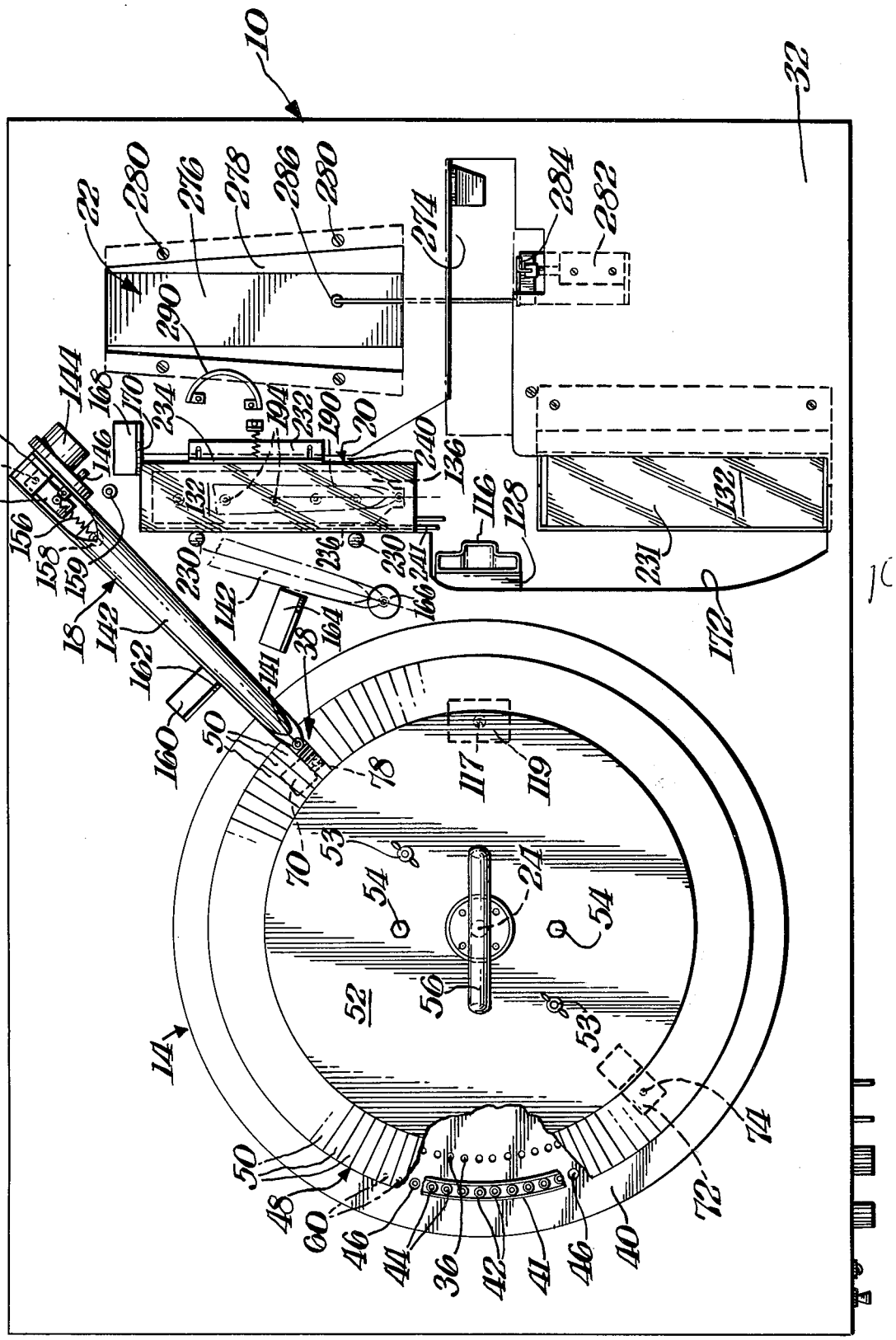

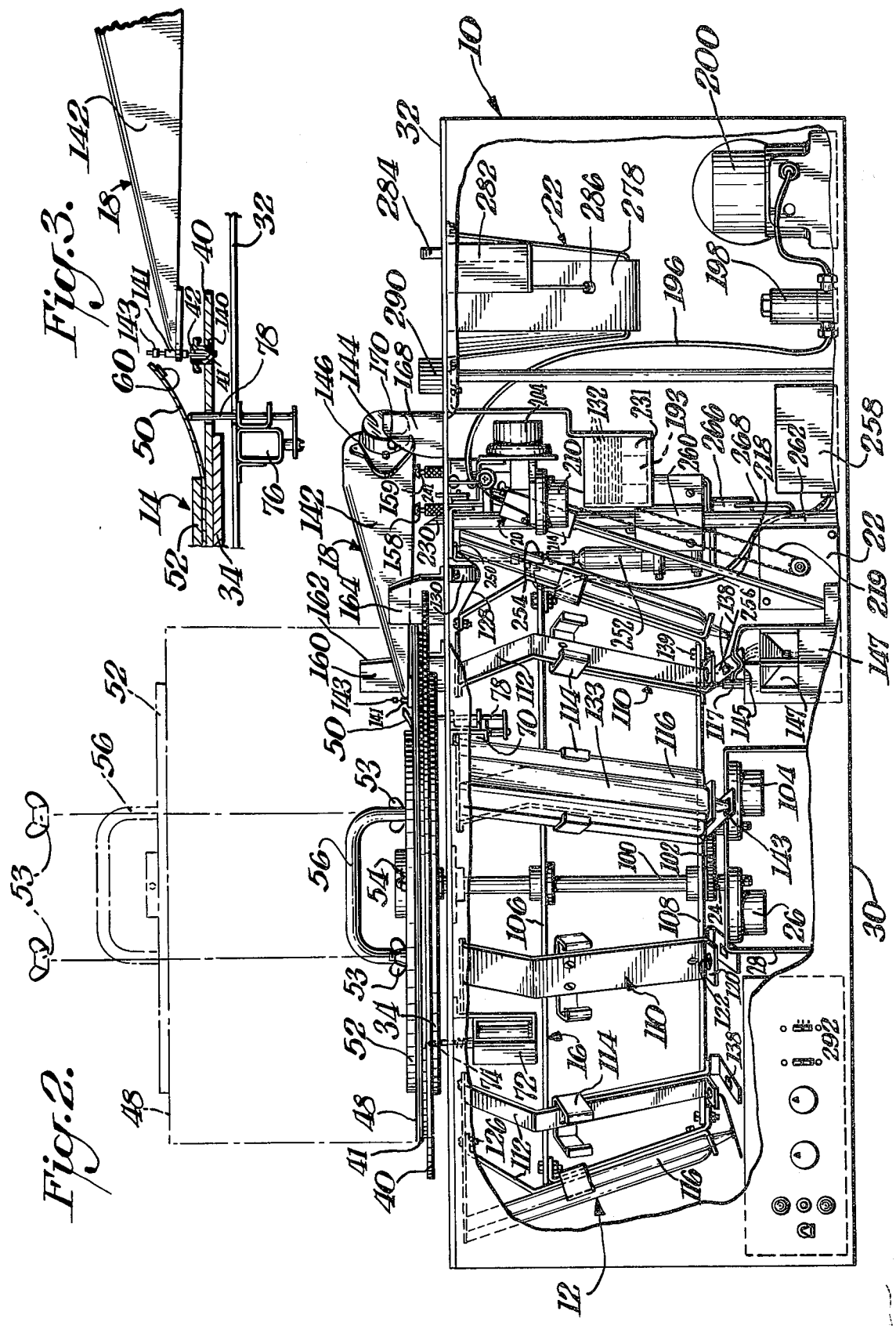

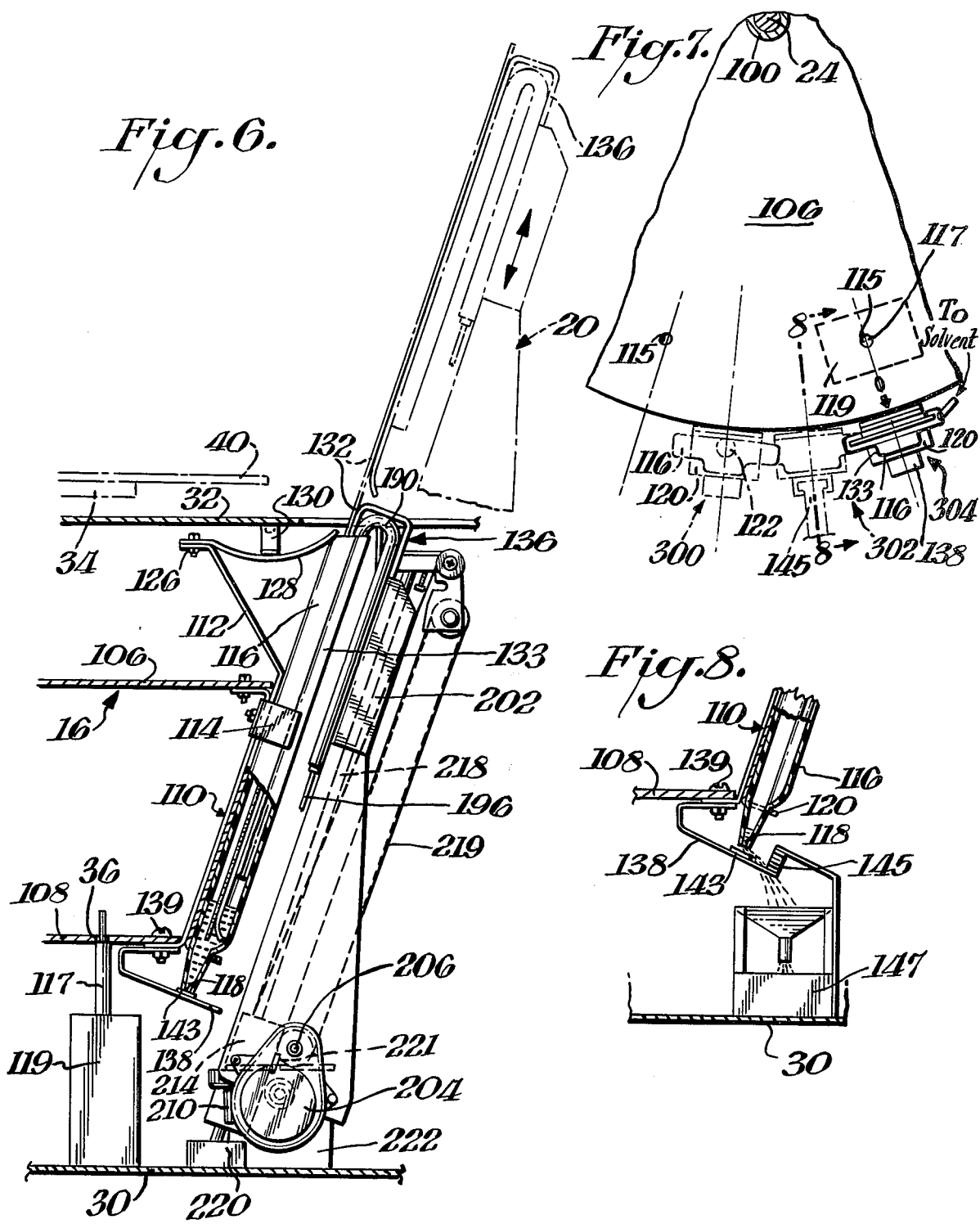

AUTOMATIC THIN LAYER CHROMATOGRAPHIC APPARATUS

BACKGROUND OF THE INVENTION

This invention relates to an automatic apparatus for processing thin layer chromatographic elements and, more particularly, to apparatus for automatically spotting and developing spotted plates in a repetative manner capable of providing accurate, reproducable analyses.

As an analytical tool, thin layer chromatography has come into extensive usage in relatively recent times. It is used in widespread applications in the separation of mixtures and solutions of various organic compounds and finds extensive usage in the analysis of urine specimens for detecting the presence of the so-called "hard drugs". The techniques used in thin layer chromatography include placing a small sample quantity at a predetermined sample location or spot on a thin film of a finely divided adsorbent or partitioning medium. This adsorbent or medium may be any of the adsorbents or mediums that are used and well known in column, paper or gas chromotography. Silica gel is one of the more widely known and used of these adsorbents. This thin layer of adsorbent is placed in a solvent such that as the solvent migrates, as a result of capillary action upwardly through the thin layer, it tends to carry the various soluble mixture components along with it. Because these components of the sample mixture are retarded in their progress through the thin layer according to their respective affinities to the material contained in the thin layer, there is in effect a spatial separation of the components of the mixture. The separation distances are characteristic and may be determined initially by a standard of reference sample. After this processing, the different distances from the spot to the several separated components are measured. This may be done by various readers that are available commercially or may be done manually by the eye and a ruler.

In a typical application, the thin layer of material if formed of a constant thickness and is placed upon a backing material such as glass, aluminum foil, or various polyester films which recently have come into widespread usage. The sample is deposited or spotted at the lower edge of this plate. The plate or chromatographic element is then placed in a vertical position in a small quantity of a solvent for development. It is this placement of the small film of adsorbent on a backing material that gives rise to the name thin layer chromatography.

Most of the techniques utilized in thin layer chromatography today involve manual techniques. These manual techniques which include manual processing, manual developing and manual reading give rise to many errors which adversely affect the accuracy of the process and affect adversely its reproduceability and repeatability. The problems encountered in these prior art manual techniques are many. For example, when different capillaries are utilized for spotting the plates, it is difficult to obtain accurate, repetitive sample aliquots. The capillary tubes themselves are only reproduceable in size within ± 2%. This gives rise to different sample aliquot volumes being placed upon the different plates from one analysis to another.

The spot must be accurately and precisely positioned relative to the lower edge of the plate. This is virtually impossible to do when manual techniques are applied. When the spots are not accurately applied, the relative retention time may vary according to the spot placement, i.e., the distance that the spots migrate during the development of the plate varies. Other problems arise when the developing tanks vary in geometry. This results in further variation of the characteristic distances from analysis to analysis. For accurate, reproduceable analysis the developing tank or chamber should be saturated with solvent vapor. If the tank is not saturated with vapor, a reproducible time varying concentration must be provided to yield reproducible results. This is difficult to achieve, thus geometry of the tank must be held constant. Further, plate developing time must be precisely controlled and every manipulative step of the plates must be accurately reproduced.

At least one system has been marketed recently which seeks to automate the thin layer chromatography process. This system is offered by J. T. Baker Chemical Company and is sold under the trademark "CHROMA-TAPES". The Baker system utilizes a continuous tape or roll of coated tape in lieu of individual plates and processess the plates through a closed chamber in which solvent is placed at several points along the strip of tape by foam members containing the solvent. While representing an improvement over manual systems, the Baker system suffers from the difficulty in achieving suitable vapor concentrations in the developing chamber, the inability to change solvents easily, the inability to accurately position the solvent relative to the application of the spot or to maintain reproducible solvent fronts, thereby altering the characteristic distances, and the inability to change plate adsorbents easily.

Accordingly, it is an object of this invention to obviate many of the disadvantages of the prior art thin layer chromatography systems.

Another object of this invention is to provide an improved automated apparatus for analyzing samples by thin layer chromatography.

Still another object of this invention is to provide an improved automatic apparatus for thin layer chromatography which system yields accurate and reproducible analyses.

BRIEF DESCRIPTION OF THE INVENTION

According to one embodiment of this invention, apparatus for automatically processing liquid samples with discrete thin layer chromatographic elements includes a spotting means for sequentially depositing an aliquot of selected samples at a predetermined spot on different ones of the chromatographic elements and developing means for sequentially subjecting each of the elements to a solvent. Preferably the solvent is maintained at a fixed fluid level relative to the spot. Timing means are included for controlling the period of time each element is subjected to the solvent. Spotting is accomplished utilizing the same capillary tube for every sample thereby obviating the volume error inherent in many prior art apparati. Samples are developed using discrete tanks for each and every element.

In a preferred embodiment of the invention this automatic apparatus utilizes a pair of pivotable arms — one a spotting arm for spotting the plates and the other a pick-up arm for handling the plates. The plates are withdrawn from a magazine when they are stored and moved to a spotting position where the spotting is accomplished. The sample vials are held in a ring-like turntable which is coaxially mounted with a tank turntable which positions the several tanks during development. Development time is acurately controlled by the time required for the tank turntable to make a complete revolution.

This apparatus obviates many of the disadvantages inherent in the prior art, and provides an accurate reproducible analysis by thin layer chromatography. The sample aliquot is accurately positioned at a precise point relative to the lower edge of the element. The inside geometry of the developing tanks is maintained the same as is the liquid volume placed in the tank. Therefore, the starting liquid level is always constant relative to the spotting point. Development time is accurately controlled by line frequency. Solvents may be substituted at will as may plates having different separating layers. A single capillary is utilized for every sample, hence, the sample volume is always maintained precisely the same from specimen to specimen.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings, in which:

FIG. 1 is a plan view of an automatic thin layer chromatography processing apparatus constructed in accordance with the preferred embodiment of this invention;

FIG. 2 is an elevation view of the apparatus illustrated in FIG. 1, partially cut away;

FIG. 3 is a fragmentary elevation view depicting the capillary tube withdrawing sample from a sample vial prior to deposition on a chromatographic plate;

FIG. 6 is a fragmentary elevation view, partially in phantom, illustrating the manner in which the plates are deposited by the pick-up arm in the discrete developing tanks;

FIG. 7 is a fragmentary plan view, partially in phantom, showing the various positions of the tank turntable during the processing of a particular chromatographic plate;

FIG. 8 is a fragmentary elevation view showing the lower portion of a typical tank depicting the manner in which the solvent is drained therefrom;

DESCRIPTION OF THE PREFERRED EMBODIMENT

Figure 4:
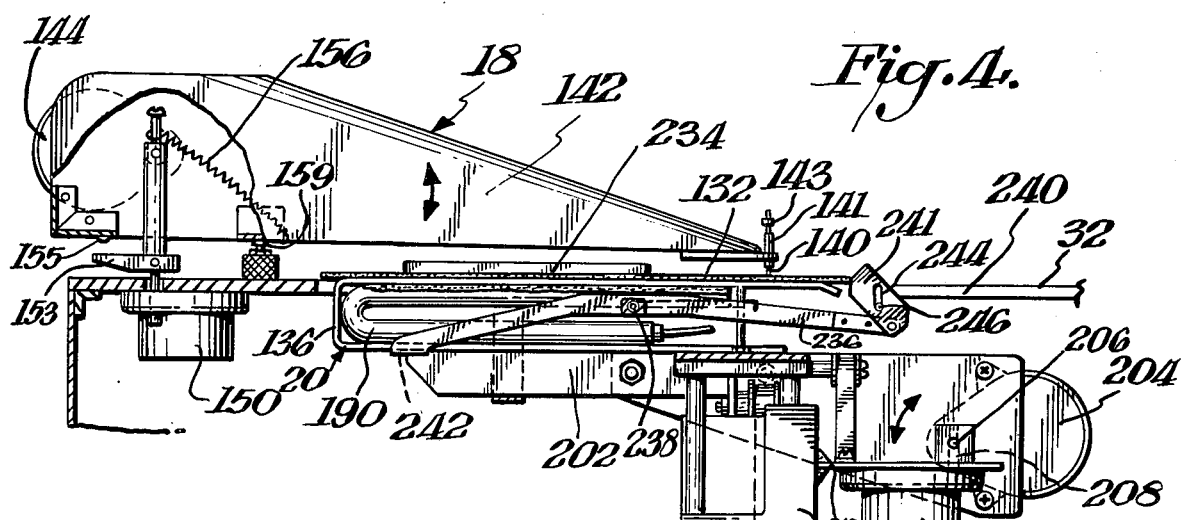
FIG. 4 is a fragmentary elevation view depicting the universal pick-up arm positioning the plate in a spotting position.

There is seen in FIGS. 1 and 2 an automatic thin layer chromatographic processing apparatus which is housed in a cabinet. 10. Essentially the apparatus may be broken down into four separate sections each of which are interrelated and work together. The first of these sections is the turntable section 12 which includes a coaxially and vertically disposed sample turntable 14 and tank turntable 16. The second is the pivotable sampling arm 18. The final two sections include a pivotable pickup arm 20 and a drying section 22, respectively.

The sample turntable 14 is mounted on a drive shaft 24 which is driven by a sample turntable drive motor 26. In turn, the sample turntable drive motor 26 is mounted on a bracket 28 positioned on the floor 30 of the cabinet 10 and extends upwardly through suitable bearings in the tip cabinet wall 32. The sample turntable is a sandwich-type structure which includes a base plate 34. Sandwiched on top of the base plate 34 is a retainer plate 40 upon which the several vials rest. Detent orifices 36 are formed about the periphery of the retainer plate 40. These serve to properly position the turntable to orient the respective sample vials, as will be described, in the sampling position 38. Also positioned in the retainer plate are ring-like strips 41 which have a plurality of evenly spaced receptacles 42 in which sample vials 44 may be inserted. Alternatively, the receptacles 42 may act as the vials 44. These mounting strips have protuberances on the lower portion thereof adapted to fit within mounting holes 46 formed in the retainer plate 40. Above the mounting strips 41 is a spring steel disc or plate 48 whose peripheral portion has a plurality of radial cuts formed therein so as to provide a leafed effect. The various leaves 50 (FIG. 3) formed thereby form a cover for each of the respective vials 44. Cap nuts 54 secure the spring plate 48 to plate 52 so the two plates may be lifted together by the handle 56. Thumb screws 53 are undone to allow removal of the above plate assembly. The lift handle 56 permits the entire spring plate to be lifted away from the retainer plate 40 and vials for cleaning, processing and otherwise refilling or working with the samples. The vial mounting strips 41 may be in shorter lengths to facilitate their filling and placement within the retainer plate 40. The drive motor 26, as are the remaining drive motors described, may be permanent magnet rotor, synchronous motors having high torque. They are available from A. W. Haydon, Waterbury, Connecticut. A small plastic vial seal 60 may be secured to the bottom surface at the peripheral portion of each of the spring leaves 50 so that they provide an airtight seal over the top of the several vials 44.

Two solenoid actuated devices — the leaf spring vial cover lifter 70 and the sample turntable detect 72 are mounted on the bottom surface of the top cover 32 of the cabinet 10. They are appropriately positioned such that the sample turntable detent 72 when not actuated has a detent pin 74 which engages the detent orifices 36 (FIG. 1). The vial cover lifter 70 has its actuating pin 76 downwardly pointing such that it operates a cover lifting pin 78 to pass through the detent orifices 36 in the turntable 14 to lift whichever leaf 50 is in alignment therewith, thereby uncovering one of the vials 44 as seen most clearly in FIG. 3 to permit a sample aliquot to be withdrawn therefrom.

The tank turntable 16 is mounted upon a central shaft 100 which is coaxially positioned over the vial turntable drive shaft 24. Its motive power is applied through an appropriate power train 102 which is driven by a tank turntable drive motor 104, also secured to the bracket 18. In this manner the tank turntable drive shaft 100 and the vial turntable drive shaft 24 may be turned and operated independently of each other by the respective motors 26 and 104, respectively. The tank turntable 16 has a pair of horizontally disposed discs 106 and 108, respectively, which are secured to the drive shaft 100. At the periphery of the two discs 106 and 108 there are secured at equally spaced intervals ten mounting tank brackets 110. Each bracket consists primarily of a bent member 112, which at the mid-portion thereof has a horizontally disposed, U-shaped slotted bracket 114 which is adapted to accommodate an elongated, rectangular tank 116 having a closed bottom with a drain orifice 118. Each tank 116 is supported at its lower end by a small extension arm 120 formed at the bottom portion of the brackets 110 and having a hole 122 formed therein to accommodate the drain orifice 118 which is somewhat nipple-like in shape. The upper portion of the member 112 is bent inwardly and a tank lid 128 is secured to the upper end thereof as by a nut and bolt 126. The tank lid 128 normally extends outwardly in a radial manner so as to pass over and press against and thereby cover the normally open tops of the tanks 116. This tank lid is flexible and resilient such that upon rotation of the tank turntable 116 it may be deflected, as seen most clearly in FIG. 2, by a cam 130 so as to be withdrawn temporarily from covering the tank. This permits solvent and a chromatographic element or plate 132 to be deposited therein or withdrawn therefrom as seen most clearly in FIG. 6. The cam 130 in the form of a bent metal strip is secured to the underneath surface of the cabinet top 32.

The lower plate 108 has a concentric pattern of holes 115 (FIG. 7) formed therein at locations corresponding to each tank position. These holes cooperate with a tank turntable detent 117 driven by a solenoid 119 and functions to position each tank in proper loading and unloading or pick-up position.

The tanks 116 as noted are elongated and rectangular with an open upper end. Along the outer tank wall as viewed in FIG. 2 they each have an outwardly extending protuberant portion 133 to facilitate the entry therein of a portion of the pick-up member 136 (FIG. 6) along with the plate 132 as will be described.

Finally, secured by a nut and bolt 139 to the lower disc 108 there is a hairpin-like resilient valve arm 138 (FIG. 8). A small resilient disc 143 is secured to the upper surface of one portion of the valve arm 138 to engage the drain orifice 118 of the tanks 116. These valve arms 138 are positioned as may be seen most clearly in FIG. 2 such that a drain or exhaust cam 145, which is secured to the floor 30 of the cabinet 10 depresses the valve arm 138 and thereby permits the tank 116 to drain into an appropriately positioned waste receptacle 147.

It may be noted that with the ten tanks illustrated (a different number may be used as desired) the tanks are located at 36° intervals. The tank drive motor 104 is geared such that when it is actuated for a 1 second interval the tanks will be rotates approximately ⅓ of this distance or 12°. Thus, there is provided three intermediate positions during which various operations are performed during the plate development process.

The second major section of the apparatus is the sample pivot arm 18. This pivot arm 18 is essentially universally pivotable such that a capillary tube 140 at its tip end portion may be positioned in the X land Y plane. To accomplish this, the pivot arm 18 includes an elongated member 142 to whose tip end the capillary 140 may be mounted. The capillary tube 140 (FIGS. 3 and 4) includes a cylindrical mounting tube 141 and a stop member 143 secured to the upper end of the cpaillary 140 so that the capillary may move coaxially within the tube. In a sense the capillary tube 140 floats within the tube 141 upwardly and downwardly. The pivot end of the elongated member 142 has secured thereto a vertically mounted spotter pivot motor 144 whose output drive shaft 146 is mounted to the output drive shaft 148 of the spotter rotating drive motor 150. This drive motor 150 is mounted in a horizontal plane to the lower side of the cabinet top 32. In this manner, with the rotating drive motor 150 in the horizontal plane and the pivot drive motor 144 mounted in a vertical plane, the spotter arm 142 is what may be termed "universally pivotable" in the X and Y plane as described hereinbefore. The sample arm or mechanism may be raised and lowered to receive a sample aliquot from the sample vials. It may be rotated so that it may be positioned away from the sample vials into the standard position or to the plate spotting position.

A spring 156 resists the downward or dipping motion of the spotter arm 142 such that it removes gear train backlash as it moves downwardly. This is particularly useful during the plate spotting operation. A pair of adjusting screws 158 and 159 are secured to the cabinet top to limit the downward motion of the spotter arm at two positions, namely, vial sampling and spotting. Similarly, a stop member 153 secured to the drive shaft 148 cooperates with a bumper 155 on the pivot arm to limit the upward movement of the pivot arm. A spotter positioning guide bracket 160 is secured to the top of the cabinet and has one side 162 bevelled such that as the spotter arm moves downwardly, as seen in FIG. 2, the spotter arm is moved gently to the right into precise alignment with the vial at the sampling position. Secondly, a spotter positioning guide bracket 164 is positioned to align the spotter arm 142 precisely with a standard or reference receptacle 166 which is positioned on top of the cabinet. The receptacle 166 holds a standard or reference sample mixture which will be used as described hereinafter as an internal standard during the plate development procedure. Finally, a third spotter positioning bracket 168 has a bevelled edge 170 to control precisely the alignment of the spotter arm during the spotting of a plate.

The third major part of the apparatus is the pick-up 20 which operates through a slot or series of slots 172 formed in the top cover 32 of the cabinet 10. It is the pick-up arm 20 which has the function of picking up the plates from a magazine or supply, positioning the plates for spotting, introducing the plates into the development tank, and after development, again removing the plates from the development tank and placing them into a chute for drying, and subsequent reading and analysis. To accomplish this, the pick-up arm 20 is made universally pivotable in the X and Y planes and is positioned contiguous to the periphery of the turntable at a plate pick-up position as seen most clearly in FIGS. 1 and 2. The pick-up arm 20 includes a U-shaped pick-up member 136. Disposed within the U-shaped pick-up portion 136 is a plate gripping means in the form of a U-shaped vacuum cavity 190. A plurality of holes 194 are formed in the pick-up portion 136 through which the vacuum cavity 190 may apply a vacuum to pick up a plate. The vacuum cavity 190 is coupled through a vacuum line 196 to a vacuum valve 198 and thence to a vacuum pump 200 (FIG. 2). Both the valve and pump are mounted on the floor of the cabinet 10.

The U-shaped member 136 in turn is coupled by an elongated angle bracket 202 to the pivot point. At the pivot end of the bracket 202 a pick-up drive motor 204 is mounted to operate in the vertical plane. The drive shaft 206 of this motor is connected to the drive shaft 208 of a horizontally disposed pick-up rotating drive motor 210 to provide the universal pivot action. In turn the rotating drive motor 210 is connected to a plate 212 which is connected to a slide block 214 having a pair of slots 216 therein which are adapted to slide vertically up and down a pair of guide rods 218 which are angularly positioned between a block 220 on the floor of the cabinet 10 and a second block secured to the top of the cabinet 32. This elevator slide block 214 is connected to be driven by a drive belt 218 which is clamped by a clamp 220 to the elevator block 214. The drive belt 18 is driven by an elevator drive motor 222 through a suitable gear train 223, which is mounted on the base of the cabinet 10.

Figure 10:
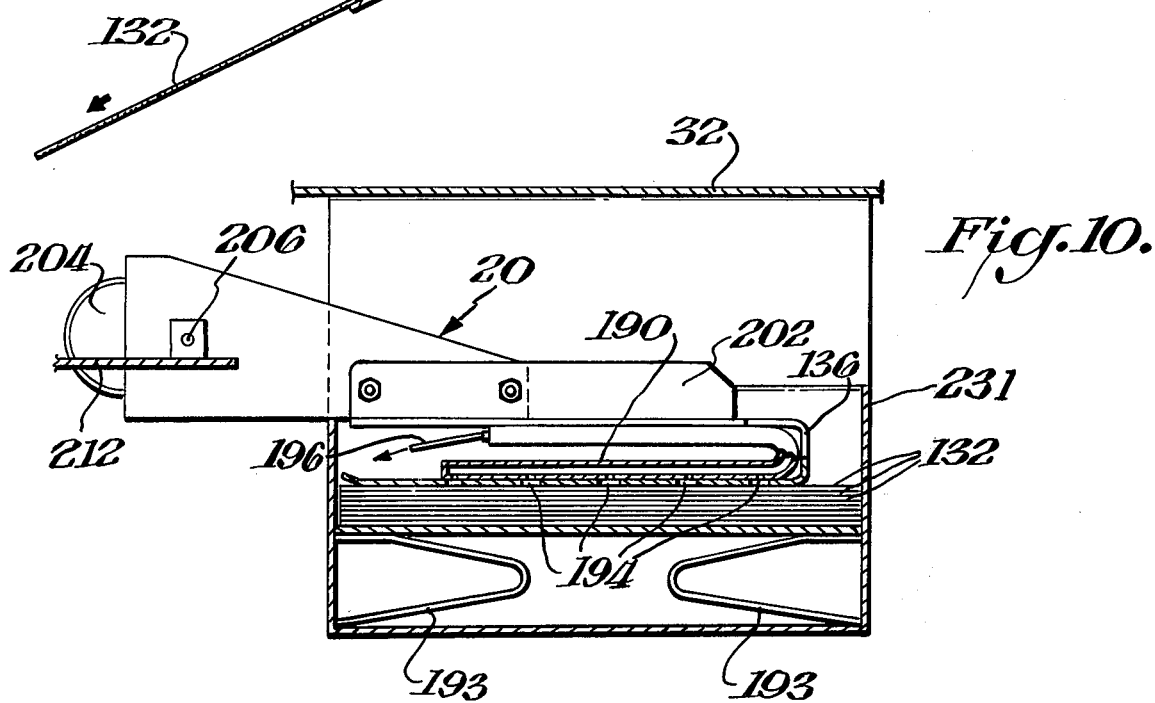
FIG. 10 is a fragmentary elevation view illustrating the manner in which the pick-up arm lifts the plates from the plate magazine.

One of the three positions between which the pick-up arm must operate is a plate magazine 231 which is in the form of an elongated box open at the top end in which the chromatographic elements or plates, properly threated of coated with the separating or coating material such as silica gel are stacked in a face down position. As used herein the terms "chromatographic elements or plates" refer to the typical elements used in thin layer chromatography as described hereinbefore, and include any of the adsorbents, in thin layer form, that are used and well known in column, paper or gas chromatography. The thin layers are placed on a backing material. The stacked plates are most clearly seen in FIG. 10. The plates in the magazine may be bathed with a gas of controlled compositon, if desired, to prevent plate contamination. Also constant torque springs 193 support a floor in the magazine which tends to hold the upper plates at a fixed level for pick-up.

Figure 5:
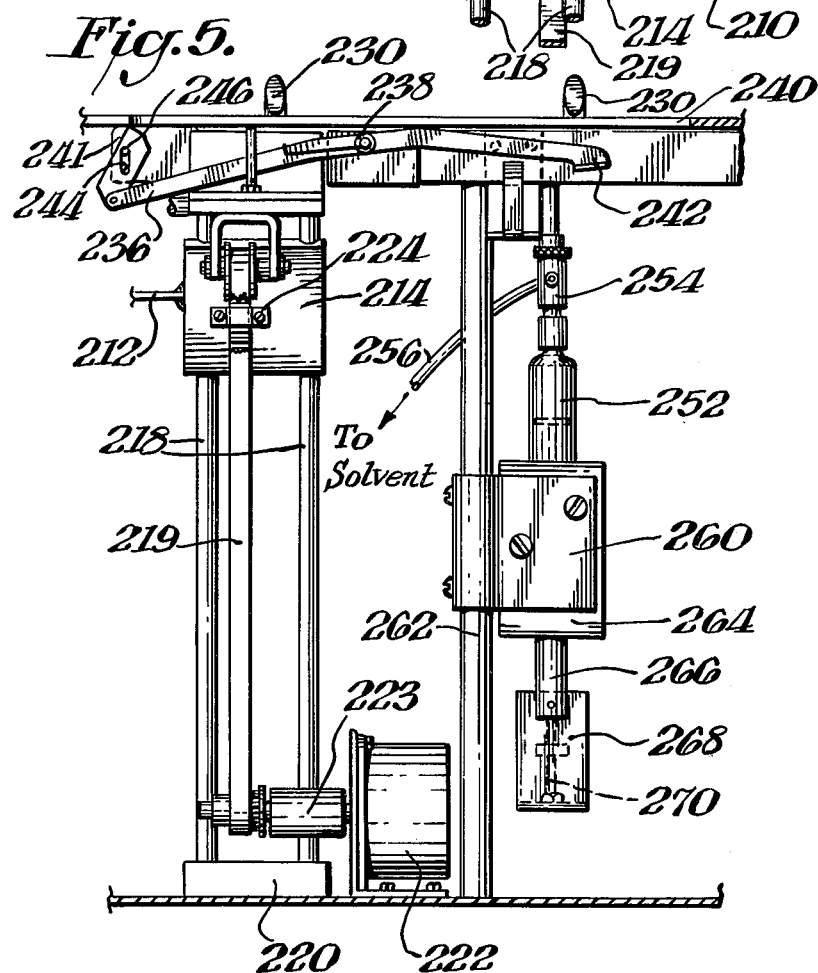
FIG. 5 is a fragmentary elevation view of the plate spotting position depicting particularly the details of the elevator mechanism which mounts the pick-up arm, a locating pivot arm which is utilized in accurately positioning the plate, together with the solvent pump.

The second pick-up arm position is the plate spotting position which is seen most clearly in the upper portion of FIG. 1. In this position, the plate which is adhered by vacuum to the U-shaped pick-up member 136 must be precisely located. To accomplish this the vacuum is released as the plate is moved into the desired position by a pair of bevelled positioning guides 230 seen most clearly in FIG. 5 along one side of the slot 240 within which the spotting takes place. On the other side of the slot a spring finger assembly 232 having a vertically bevelled edge 234 maintains the plate 132 firmly placed against the base of the positioning guides 230. The upper end of the plate (upper end in the drawing of FIG. 1) is positioned by the positioning guide 168. The plate is forced back against the positioning guide by a positioning lever 236 which is pivoted around a central pivot pin 238 along the edge of the slot 240. Referring particularly to FIG. 5, the righthand end of the lever 236 (in the drawing) has a bent tab 242 which is adapted to engage the edge of the pick-up member when it is pivoted into the slot 240. A pivot arm 241 is pivoted to the other end of the positioning lever 236. A slot 244 in the pivot lever 236 engagaes a pin 246 in the side of the slotted opening 240. The pin 246 and the pin 238 may be mounted on a mounting bracket 248 secured to the cabinet top 32. Thus, when the tab 242 is pressed downwardly by the movement of the pick-up member 136, the free end of the pivot arm 241 is caused to move to the right (in drawing of FIG. 5) thereby forcing the plate 32 against the back stop formed by the positioning guide 168 (FIG. 1). It is apparent now that the plate 32 is positioned in both the X and Y directions with respect to the cabinet top. The vacuum is now reapplied to the pick-up surface of the plate as will be described. The plate while in the spotting position may be bathed with a gas of controlled composition, i.e., the type of gas as well as the humidity may be controlled.

Solvent is injected into the tanks in the loading position through a solvent line 250. Solvent is forced through the solvent line by a solvent syringe 252. The output of the syringe in turn is connected through a three-way valve 254 with the input to the valve being from a solvent supply line 256, which is coupled to a solvent reservoir 258 (FIG. 2) mounted on the floor of the cabinet. The syringe 252 is mounted in a syringe mount 260 which is secured to a mounting post 262. Also secured to the syringe mount 260 is a solvent solenoid 264 whose actuating arm 266 is connected as by a bracket 268 to operate the solenoid plunger 270. Thus, when the plunger 270 is withdrawn, i.e., moved downwardly by a spring (not shown in the drawing) fresh solvent is drawn into the syringe through the supply line 256. When the plunger is moved upwardly, or depressed, solvent is dispensed through the three-way valve 254 and the solvent dispensing line 250 to fill the tank in loading position. This linkage provided by the bracket 268 for the plunger drive may be made adjustable thereby to vary the volume of solvent dispensed.

Figure 9:
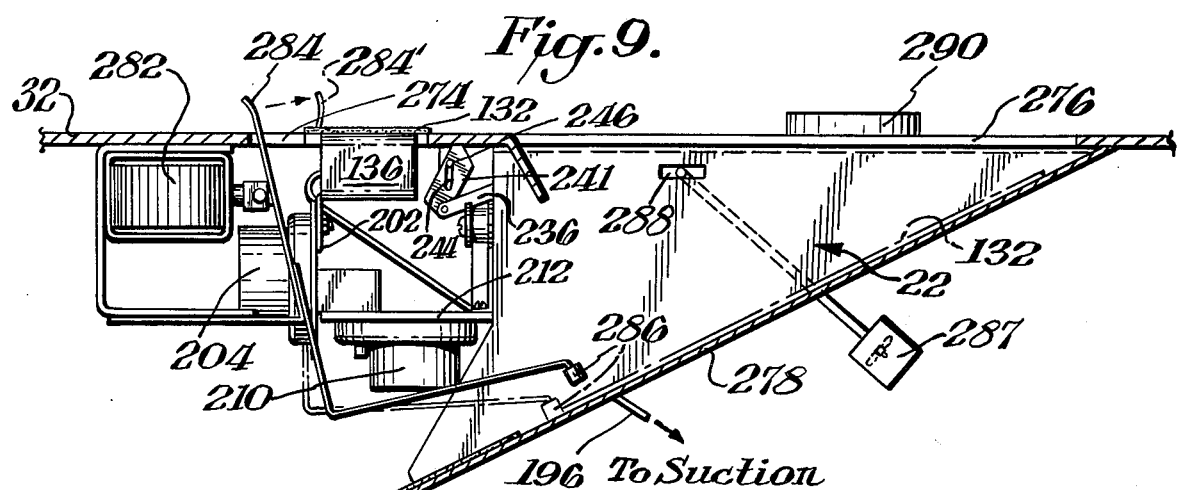
FIG. 9 is a fragmentary elevation view of the chute which is utilized in drying the plates after development.

The final major section of the apparatus is the drying section. In this section the pick-up pivot arm 20 moves over into the slot 274 which is directly opposite the tank pick-up position. This slot is perpendicular to an adjacent discharge slot 276 in which there is disposed a downwardly sloping chute 278 secured to the top of the cabinet 32 as by screws 280. From the slot 274, the plate is in effect flipped over into the discharge chute. The flipping is accomplished utilizing a plate flipper solenoid 282 which is secured to the cabinet top 32. This solenoid's actuating arm operates an angled stop member or flipper 284 (FIG. 9). The stop member 284 is resilient and has a pad 286 at its lower end adapted to engage the bottom of the chute 278 thereby to retain a plate 132 thereon until it is dry. Drying is accomplished by a fan 287 blowing warm air through air vent 288 across the surface of the plate 132 for drying purposes. The flipper 284 operates between the position shown and that shown in phantom at 284'. As it is actuated it throws the plate sideways in the drawing. A bumper 290 secured to the cabinet top engages the plate and causes it to pivot into a position where it can drop into the chute 278. It is prevented from sliding down the chute by the stop 286 on the end of the flipper arm.

The several motors and solenoids illustrated herein, including the vacuum valves, are all electrically actuated by signals derived from the central control unit 292. This control unit may be electronic. In the alternative, it may be a simple rotary switch driven by a synchronous motor or solenoid so that it advances on a unit time basis to cause the several motors, solenoids and the like to operate according to the illustrative selected schedule set forth in the table I below.

In describing a typical operation of the apparatus illustrated reference will be made to Table I. In this table it may be seen that the several prime movers — solenoids, and motors which actuate the elements of the apparatus are all controlled on a strict time basis. This time basis comprises a cycle during which a tank holding a developed plate is emptied of solvent and moved to the pick-up position where the plate is removed and transferred to the drying area. Next a new plate is withdrawn from the magazine, spotted with a sample aliquot and placed in the tank for development.

Thus, in the first second of a typical cycle of operation, a tank is moved after development from the hold position 300 (FIG. 7) in which it was placed during the previous cycle. In the first second of operation this tank is moved from the hold position 300 to the solvent drain position 302 which represents another 12° rotation of the tank turntable 16. As the tank moves to the drain position, the valve arm 138 engages the tank exhaust cam 145 and the exhaust port 188 of the tank is opened and allowed to evacuate the tank solvent into the waste receptacle 147. Draining takes place for an additional two seconds. Next during the fourth second of the cycle, the tank turntable motor is again actuated to move the tank turntable 16 twelve more degrees into the pick-up psoition 304 (FIG. 7) where the detent 11 locks the tank in place using the hole 115. The tank exhaust port leaves the cam and again is closed.

During the fifth second the pick-up member 136, which is normally in a vertical position poised over the tank, is lowered into the tank on the bottom side of the plate 132 as seen most clearly in FIG. 6. It will be recalled that as the tank is moved into the pick-up position 304, the cam 130 caused the tank lid 128 to be deflected away from the opening of the tank. Next, the vacuum is applied to the pick-up arm 20 by actuating the vacuum valve 190 for a period of 6 seconds. During the third second of vacuum operation (by now the plate is firmly gripped by the vacuum applied) the pick-up arm 20 with the plate attached is withdrawn from the tank by actuating the elevator motor 222 to raise the pivot arm assembly 20.

In the next second the pivot arm assembly 20 is rotated in a clockwise sense in a vertical plan to position the plate 132 within the plate flipper slot 274. The plate is turned over during this step with the coated side up. It will be recalled that this plate has now been developed and is ready for drying. This operation only takes 4 seconds and during the final second the plate flipper solenoid is cocked to flip the plate over against the bumper 290 so that the plate is permitted to turn and fall into the chute 278. With the cocking, the pad 286 is lifted and the preceding plate in the chute, which has completed drying, is allowed to slide on down the chute for reading or further analysis by any of the standard scanners that are available. The vacuum grip on the plate is removed and the plate flipper released. When the cocked flipper is released, it snaps forward to slide the plate across the upper surface of the cabinet top 32 unit, striking the bumper 290, the plate flips 90° and drops into the chute. The pad 286 again blocks the movement of the new plate 132 and prevents it from dropping down the chute beyond the drying zone.

With this accomplished, the pick-up pivot drive motor 204 is actuated to rotate the pick-up arm back in the vertical plane out of the flipper slot 274. After 3 seconds, the pick-up arm rotate drive motor 210 is actuated so that the pick-up arm now moves over and down into the plate magazine 231 from the purpose of picking up a new plate. As the pick-up arm approaches the plate magazine, vacuum is again applied through the holes 194 such that as the arm comes into contact with the backside of the top plane (the plates are stacked upside down in the magazine) it engages and grips the plate. The plates are stacked utilizing a spring 193 such that the plates are always maintained at a substantially constant level. During the twenty-fourth second, as may be seen from the Table I, the pick-up pivot drive motor 204 is energized to pivot the pick-up arm and withdraw the plate from the magazine, turn it over and place it coated side up in the spotting position. To accomplish this the plate is pivoted 180°.

While this pivoting into the spotting position takes place, during the twenty-seventh second and for a period of 7 seconds thereafter, the vial lid of that sample vial in the sampling position is lifted by actuating the vial cover solenoid 70. This exposes the contents of the sample vial to be analyzed to the spotter arm, which is actuated during the twenty-eighth second to dip the capillary tube 140 down into the vial. The vial's contents are sucked up by capillary action. During the thirty-second and thirty-third seconds, the spotter arm is lifted up and the capillary tube withdrawn from the vial such that during the thirty-fourth and thirty-fifth seconds the spotter arm can be rotated back to the spotting position. Spotting takes place for a period of 5 seconds during which the spotter pivot motor 144 is actuated to move the spotter arm downwardly for two seconds and then the motor is alternated in direction at 1/10 second intervals so as to cause the capillary tube to dot (move up and down) against the spotting position on the plate tem times. Up and down movement of the spotting arm is limited, as described by the adjustment of the adjusting screws 158 and 159 and by the position of bar 153 (FIG. 4). The spotting arm is aligned precisely by the bracket 168. The spotting arm contacts the bracket and as it moves downwardly is positioned laterally to the spotting position. The plate 132 is aligned precisely sideways by the guide members 230 and the spring arm 232 and longitudinally by the bracket 168 and pivot arm 241 (FIG. 5) as was described. During plate alignment, the vacuum is momentarily removed during the thirty-third second to facilitate positioning of the plate.

Next, the sample spotter arm 18 is lifted and rotated clockwise until it is in registry with the standard receptacle 166. At this time the spotter pivot motor 144 is again actuated to move the sample arm downwardy into the standard receptacle in which a standard sample is retained. After 1 second, the sample arm is again lifted out of the sample retainer and rotated again to the plate spotting position at which time the sample arm is lowered again to the plate and the same ten dot spotting sequence repeated to deposit the standard sample aliquot directly over the sample to be analyzed. The sample arm is laterally positioned accurately into the standard receptacle by the spotter positioning guide 164 which functions the same as the guide 160. Although not shown an air jet may now be acutated to pass drying air over the spot to evaporate any volatiles, solvents, etc.

Having now deposited the standard sample on the plate, the sample spotter is rotated back to the vial sampling position to await the positioning of the next sample. During the fiftieth second, as noted in Table I, the now spotted plate, in need of development, is raised endwise to the vertical position by actuation of the pick-up pivot motor 204. Shortly thereafter, beginning at the fifty-second second, the pick-up rotate motor 210 is actuated to rotate the plate 90° to the plate pick-up position such that it may be introduced into the next tank. At this same time, the sample turntable detent 72 is actuated along with the sample turntable motor 26 for 1 second, a period of time sufficient with the selected gearing, to rotate the next sample vial into the sampling position. At the same time, the solvent solenoid plunger is actuated to injecct a predetermined, precise quantity of solvent into the tank that is now positioned and about to receive the spotted plate. With the plate now in position at the fifty-seventh second, the elevator motor 222 is actuated to lower the spotted plate into the tank for development with the spotted end down. The vacuum is removed to release the plate and the pick-up arm lifted out of the tank. During the fifty-ninth second the turntable detent is actuated to remove the detent and the tank turntable drivemotor 104 actuated to rotate the tank 12 more degrees, which as previously described, is actually rotating a previous tank into the hold position 300 preparatory to draining its solvent during the next cycle. It should be noted that the tank turntable dent 117 will not again engage a detent receptacle until it is in the tank loading position which will not occur until the fourth second of the next cycle.

It is thus seen that a complete cycle has taken place during which time a developed plate was removed from a discrete individual developing tank. The developed plate was placed into a drying position and a new plate withdrawn from the plate magazine, spotted with a sample aliquot taken directly by the same capillary tube used for every sample. As internal standard may be used as described. The standard is applied to the plate by depositing a known standard sample directly over the spotted sample aliquot to be analyzed. The plate thus spotted with sample and standard is insereted into a new discrete tank with the spotted end immersed to a predetermined level of solvent for plate development. This tank is allowed to rotate around during a cycle requiring a minimum of ten minutes of operation if all tank positions are used. The processing of each plate for each tank position requires 1 full minute.

In alternative embodiments of the invention, each alternate vial may be filled with a solvent for the purpose of additional rinsing or cleaning of the capillary. To provide for this process it is merely necessary to reprogram the cycle sequence such that somewhere between time zero and the twenty-sixth second of the time sequence table illustrated in FIG. 1, the sample turntable detent and the spotter drive motor are selectively actuated to first move a new vial into the sample pick-up position, lift the vial seal in the manner previously described, and dip the capillary up and down into the rinsing solvent vial. The capillary may then be moved to a suction line to remove the rinse solvent. It has been found, generally, however, that such suquencing is not necessary for accurate reproducible analyses, but certainly is available for operations requiring it. As another alternative the standard sample may be replaced by a solvent for rinse purposes. Without modifying the sequence, this can cause some undesired spreading of the spot, but otherwise causes little error.

Of course, the capillary may be drained of the rinse solvent by the use of a vacuum line as described or by spotting a plate used exclusively for that purpose and positioned at a convenient location.

In still another alternative, different solvents may be dispensed into the developing tank, by the expedient of duplicating the existing solvent dispensing system such that either one of the systems may be actuated to inject solvent. Also, the tank may be drained of one solvent and refilled with another at some intermediate location. This permits development by two different solvents so that components of the sample aliquot not soluble in one solvent can be devloped by the second.

In similar manner, plates coated with different thin layer materials may be employed. This may be accomplished by utilizing a pair of slide-by-side plate magazines which are actuated by a solenoid such that one or the other magazine is in the plate pick-up position at the time the plate pick-up arm is lowered for this purpose. It is also apparent that the developing times may be varied simply according to the program selected. While a minimum 10 minute cycle has been illustrated for 10 tanks, any desired amount of time may be selected for this purpose down to, of course, a minimum time which is required for the electro-mechanical components to be pivoted and rotated as described.

In still another alternative embodiment, the spotter positioning guide 168 may be solenoid controlled or motor driven so as to position it laterally relative to the width of the plates 132 thereby to permit the spotting of the plate to occur at several different locations across the bottom width of the plate. By this technique, several spots may be placed on a single plate and all developed simultaneously. There is some slight error in positioning of the spot by this method due to the radius of curvature of the pivot arm. However, this error for the radial distance under consideration is slight and reproducible.

While individual discrete plates have been demonstrated, it is to be understood that the plates may be sotred in the form of a continuous strip or roll and dispensed by cutting each of the plates as it is unrolled from the supply roll. This cutting may be accomplished by a simple knife arrangement or other technique similar to that used in some of the copying systems available on the market today. It is also to be understood that instead of positioning the plate magazine as illustrated at 230, it may be located in the spotting location and spotted in position. Also, the plate itself may be introduced into the developing tank prior to spotting. In this alternative a magnetic strip of material may be placed on the exterior of the tank and an electromagnet attached to the pick-up arm such that after the plate is introduced into the tank, the electromagnet may be actuated to lift up the tank and plate together for repositioning into the spotting position. Access through one wall of the tank must be provided in this instance to accommodate the spotting capillary.

it is often desirable to bathe the magazine with a relatively inert gas such as nitrogen to avoid contamination of the surfaces of the plate while they are awaiting use. Use of a controlled humidity gas is also useful. Also, as described, one may bathe the sample area with a gas of controlled composition, termperature and humitidy to avoid plate contamination. If desired the plates may be cooled with ink marks or similar indicia while in the spotting position to provide a method of later identification.

There has thus been described a relatively precise automatic apparatus for handling the squential testing and analysis of various samples by thin layer chromatography. Each plate after spotting is developed in a discrete tank with a precisely controlled starting level of solvent and a reproducible degree of vapor saturation within the tank. The spot is accurately positioned on each plate and with constant tank geometry the solvent level relative to the spot is always constant such that analyses are highly reproducible. The same capillary is utilized for each and every spotting operation, thereby further reducing error. There is little or no variation in the quantity of sample used in each analysis. The capillary tube with sample is exposed to the air for only a short period of time between sampling and spotting hence there is little loss of volatiles. The development time is accurately controlled by the line frequency available from the power system. Each operation is precisely repeated and accomplished in the same manner and in the same period of time. Alternate solvents and alternate plates may be used as desired. Hence, most sources of error normally associated with thin layer chromatography are eliminated.

It is obvious that many embodiments may be made of this inventive concept, and that many modifications may be made in the embodiment hereinbefore described. Therefore, it is to be undertoood that all descriptive material herein is to be interpreted merely as illustrative, exemplary, and not in a limited sense. It is intended that various modifications which might readily suggest themselves to those skilled in the art be covered by the following claims as far as the prior art permits.

What is claimed is:

1. Apparatus for automatically processing liquid samples with discrete, thin layer chromatographic elements each being independent of and freely movable relative to each other comprising, in combination:
   spotting means for depositing an aliquot of selected ones of said samples at a predetermined spot on different ones of said chromatographic elements, and
   developing means for sequentially subjecting each of said elements to a solvent.

2. Apparatus according to claim 1 which also includes timing means for controlling the period of time that each said element is subjected to said solvent.

3. An apparatus according to claim 1 wherein said spotting means comprises a single means employing capillary action for withdrawing and depositing all of said sample aliquots.

4. An apparatus according to claim 1 wherein said spotting means includes reference means for depositing an aliquot of a reference solution at said predetermined spots on each of said different elements.

5. An apparatus according to claim 1 wherein said developing means includes tank means for subjecting each of said elements to a fixed solvent level relative to a said spot.

6. An apparatus according to claim 1 wherein said developing means includes:
   a plurality of discrete tanks,
   means for sequentially positioning each of said elements in a different one of said tanks, and
   means for dispensing a sufficient quantity of said solvent in each said tank to achieve a fixed fluid level relative to said spots on said elements.

7. An apparatus according to claim 6 which also includes:
   means for removing each said element from the respective tanks after development, and
   means for drying said elements.

8. An apparatus according to claim 6 which also includes means for removing each said element from the respective tanks after a predetermined period of time in each said tank.

9. An apparatus according to claim 6 wherein each said tank has substantially the same internal volume and configuration and said dispensing means dispenses a predetermined quantity of said solvent in each said tank, thereby to maintain constant the vapor space and liquid level relative to said spot in each of said tanks.

10. An apparatus according to claim 1 wherein said spotting means includes:
    an element positioning means,
    means for stacking said elements,
    a pick-up arm pivotable at one end and having an element gripper at the other end, and
    first drive means for operating said pick-up arm and element gripper to transfer sequentially individual elements from said stacking means to said positioning means for spotting.

11. An apparatus according to claim 10 wherein said developing means includes:
    a ring-like support member,
    a plurality of fluid tanks positioned about the periphery of said support member,
    second drive means for intermittently positioning each of said tanks to a develop position, said first drive means operating said pick-up arm to transfer sequentially spotted elements from said positioning means to said develop position, thereby to introduce a single spotted element into each said tank for development.

12. An apparatus according to claim 11 which also includes means for introducing a predetermined level of solvent into each said tank prior to a deposition of a spotted element therein.

13. An apparatus according to claim 11 which also includes:
    means for withdrawing solvent from each said tank after developing each element, and
    said first drive means operating to remove a developed element from each said tank prior to introducing a spotted element.

14. An apparatus according to claim 1 which also includes:
    a spotting arm pivotable at one end and having single means using capillary action for withdrawing stored fluid positioned at the other end,
    a sample pick-up position, and
    first drive means for operating said spotting arm and said single means to transfer sequentially sample solutions from said pick-up position to each of said elements.

15. An apparatus according to claim 14 wherein said spotting means includes:
    a ring-like support tray adapted to hold a plurality of receptacles, and
    second drive means for rotatably and sequentially positioning each of said receptacles in registry with said pick-up position, said first drive means operating to dip said capillary tube into respective ones of said receptacles for transfer of a sample solution to said element.

16. Apparatus for automatically processing sample solutions with thin layer chromatographic elements comprising, in combination:

a pick-up mechanism operating to deposit and remove said elements relative to a pick-up position, a ring-like support member having a plurality of fluid tanks for developing said elements positioned about the periphery of said support member, and drive means operating on said support member for intermittently positioning each of said tanks to said pick-up position whereby said pick-up mechanism can remove a developed element from said tank and position a spotted but undeveloped element therein.

17. An apparatus according to claim 16 wherein each of said tanks has a drain in the bottom portion thereof and said ring-like support member has a spring-like valve closing each of said drains and which apparatus also includes:

a valve cam positioned relative to the periphery of said support member operating to open said valve as each said tank is rotated past its position, thereby to drain said tanks of solvent.

18. An apparatus according to claim 16 which also includes a solvent reservoir and deispensing means for intermittently dispensing a selected volume of solvent from said reservoir into each said said tank at said pick-up position, thereby to permit the development of said elements.

19. An apparatus according to claim 16 which also includes:

a ring-like structure, a plurality of sample receptacles disposed peripherally about said structure, thereby to hold sample solutions, a spotting mechanism adapted to withdraw a sample solution from each of said receptacles at a predetermined sampling location, drive means for moving said structure and said spotting meachanism into registry with each other at said sampling location, thereby to sequentially withdraw sample aliquots from said receptacles, and additional means for operating said sampling mechanism to sequentially spot different ones of said elements with said sample solutions.

20. An apparatus according to claim 16 which also includes means for intermittently depositing an aliquot of each said sample solution at a predetermined spot on different ones of said elements.

21. An apparatus according to claim 20 which also includes a solvent reservoir and dispensing means for intermittently dispensing a selected volume of solvent from said reservoir into each said tank at said pick-up position, thereby to permit the development of said elements.

22. An apparatus according to claim 5 which includes means to separate sequential ones of said elements from exposure to said solvent after a predetermined period of time.

23. An apparatus according to claim 3 wherein said means for employing capillary action is a capillary tube.

24. An apparatus according to claim 1 which includes tank means for vertically positioning each of said elements in the solvent.

25. An apparatus according to claim 6 wherein said spotting means includes:

an element positioning means, means for stacking said elements, a pick-up arm pivotable at one end and having an element gripper at the other end, and first drive means for operating said pick-up arm and element gripper to transfer sequentially individual elements from said stacking means to said positioning means for spotting.

26. An apparatus according to claim 25 wherein said developing means includes:

a ring-like support member, a plurality of fluid tanks positioned about the periphery of said support member, second drive means for intermittently positioning each of said tanks to a develop position, said first drive means operating said pick-up arm to transfer sequentially spotted elements from said positioning means to said develop position, thereby to introduce a single spotted element into each said tank for development.

27. An apparatus according to claim 14 wherein said means for using capillary action is a capillary tube.

28. An apparatus according to claim 19 wherein said spotting mechanism comprises a single means employing capillary action to withdraw said sample solution.

* * * * *

UNITED STATES PATENT OFFICE
CERTIFICATE OF CORRECTION

Patent No. 3,904,372  Dated September 9, 1975

Inventor(s) Gene E. Lightner

It is certified that error appears in the above-identified patent and that said Letters Patent are hereby corrected as shown below:

Column 1, line 35, "of" should be---or---.
Column 2, line 11, after "varying" ---vapor--- has been omitted.
Column 4, line 14 "tip" should be---top---.
Column 5, line 1 "18" should be---28---.
Column 5, line 61, "rotates" should be---rotated---.

Column 7, line 30, "threated of" should be---treated or---.
Column 7, line 41, "composiiton" should be---composition---.
Column 7, line 64, before "pick-up" ---U-shaped--- was omitted.
Column 11, line 26, "psoition" should be---position---.
Column 11, line 44, "plan" should be---plane---.

Column 12, line 2, "from" should be---for---.
Column 12, line 35, "tem" should be---ten---.
Column 13, line 13 "injecct" should be---inject---.
Column 13, line 27, "dent" should be---detent---.
Column 13, line 37, "As" should be---An---.
Column 13, line 41, "insereted" should be---inserted---.
Column 14, line 16, "slide-by-side" should be---side-by-side---.
Column 14, lines 41 and 42, "sotred" should be---stored---.
Column 14, line 60, "it" should be---It---.
Column 17, line 30, "deispensing" should be---dispensing---.

Signed and Sealed this sixth Day of April 1976

[SEAL]

Attest:

RUTH C. MASON
Attesting Officer

C. MARSHALL DANN
Commissioner of Patents and Trademarks